US012686354B2

(12) United States Patent

Mitsuoka et al.

(10) Patent No.: US 12,686,354 B2

(45) Date of Patent: Jul. 21, 2026

(54) SEAT BACK

(71) Applicant: TOYOTA BOSHOKU KABUSHIKI KAISHA, Aichi-ken (JP)

(72) Inventors: Naoki Mitsuoka, Miyoshi (JP); Yukinori Sugiura, Nisshin (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 19/119,338

(22) PCT Filed: Oct. 5, 2023

(86) PCT No.: PCT/JP2023/036316

§ 371 (c)(1),
(2) Date: Apr. 8, 2025

(87) PCT Pub. No.: WO2024/084978

PCT Pub. Date: Apr. 25, 2024

(65) Prior Publication Data

US 2026/0054678 A1 Feb. 26, 2026

(30) Foreign Application Priority Data

Oct. 18, 2022 (JP) ................................. 2022-166734

(51) Int. Cl.
  B60R 21/207 (2006.01)
(52) U.S. Cl.
  CPC .................................. B60R 21/207 (2013.01)
(58) Field of Classification Search
  CPC .................................................. B60R 21/207
  See application file for complete search history.

(56) References Cited

U.S. PATENT DOCUMENTS 5,556,127 A * 9/1996 Hurford .............. B60R 21/2171
                                                    280/730.2
6,450,528 B1 * 9/2002 Suezawa ............... B60R 21/207
                                                    280/730.2

(Continued)

FOREIGN PATENT DOCUMENTS

BR 102014001535 A2 * 1/2016 ........... B60R 21/207
CA      2979470 A1 * 4/2018 ........... B60R 21/207

(Continued)

OTHER PUBLICATIONS

International Search Report issued in International Patent Application No. PCT/JP2023/036316, dated Dec. 26, 2023, along with an English translation thereof.

(Continued)

*Primary Examiner* — Nicole T Verley

(74) *Attorney, Agent, or Firm* — Greenblum & Bernstein, P.L.C.

(57) ABSTRACT

This seat back includes a side airbag device that is attached to the outer portion of a back frame, and a side pad in which a cushion body elastically supporting a seater, a side cover covering the side pad, and a side resin member that is provided to the pad rear surface of the side pad and is responsible for supporting the side pad, fastening an end of the side cover, and fixing to the back frame. The cushion body is provided so as to cover the side airbag device from the front of the seat, and the side resin member has an opening for opening a deployment area of the airbag that inflates to the front of the seat.

9 Claims, 9 Drawing Sheets

(56)                    References Cited

U.S. PATENT DOCUMENTS

| | | | | |
|---|---|---|---|---|
| 6,578,911 | B2 * | 6/2003 | Harada | B60R 21/207 |
| | | | | 280/730.2 |
| 9,914,421 | B2 * | 3/2018 | Line | B60N 2/6009 |
| 10,857,964 | B2 * | 12/2020 | Kobayashi | B60R 21/2342 |
| 10,875,487 | B2 * | 12/2020 | Kobayashi | B60R 21/207 |
| 11,325,553 | B2 * | 5/2022 | Negishi | B60R 21/207 |
| 11,760,242 | B2 * | 9/2023 | Reith | B60N 2/72 |
| | | | | 297/394 |
| 12,077,079 | B2 * | 9/2024 | Mitsuoka | B60N 2/70 |
| 12,083,939 | B2 * | 9/2024 | Miyawaki | B60N 2/42709 |
| 12,097,790 | B2 * | 9/2024 | Mitsuoka | B60N 2/70 |
| 2006/0113771 | A1 * | 6/2006 | Tracht | B60R 21/207 |
| | | | | 280/730.2 |
| 2006/0113773 | A1 * | 6/2006 | Tracht | B60R 21/207 |
| | | | | 280/730.2 |
| 2013/0175792 | A1 * | 7/2013 | Fukawatase | B60R 21/207 |
| | | | | 280/728.2 |
| 2016/0159307 | A1 * | 6/2016 | Fujiwara | B60R 21/013 |
| | | | | 280/729 |
| 2017/0225640 | A1 * | 8/2017 | Ohno | B60R 21/264 |
| 2019/0176740 | A1 * | 6/2019 | Hioda | B60N 2/2222 |
| 2020/0070699 | A1 * | 3/2020 | Kakishima | B60N 2/72 |
| 2020/0331422 | A1 * | 10/2020 | Matsuzaki | B60R 21/23138 |
| 2022/0340059 | A1 * | 10/2022 | Mitsuoka | B60N 2/686 |

FOREIGN PATENT DOCUMENTS

| | | | | | |
|---|---|---|---|---|---|
| CN | 104773098 | A | * | 7/2015 | B60N 2/64 |
| CN | 111169342 | B | * | 9/2023 | B60N 2/64 |
| GB | 2433919 | A | * | 7/2007 | B60R 21/207 |
| JP | 4463700 | B2 | * | 5/2010 | B60N 2/5825 |
| JP | 2014151822 | A | * | 8/2014 | B60N 2/986 |
| JP | 2018172067 | A | * | 11/2018 | |
| JP | 2019-98816 | | | 6/2019 | |
| JP | 2020-33005 | | | 3/2020 | |
| JP | 2020-175784 | | | 10/2020 | |
| JP | 2021-167145 | | | 10/2021 | |
| TH | 96632 | B | * | 11/2023 | |
| WO | 2012/035619 | | | 3/2012 | |
| WO | WO-2012053082 | A1 | * | 4/2012 | B60N 2/289 |
| WO | WO-2012101809 | A1 | * | 8/2012 | B60R 21/207 |
| WO | WO-2013005308 | A1 | * | 1/2013 | B60N 2/682 |
| WO | WO-2013014800 | A1 | * | 1/2013 | B60N 2/5825 |
| WO | WO-2013137355 | A1 | * | 9/2013 | B60R 21/207 |
| WO | WO-2014104199 | A1 | * | 7/2014 | B60N 2/68 |
| WO | WO-2015080213 | A1 | * | 6/2015 | B60R 21/207 |
| WO | WO-2015108120 | A1 | * | 7/2015 | B60R 21/207 |
| WO | 2016/010011 | | | 1/2016 | |
| WO | WO-2018179515 | A1 | * | 10/2018 | B60R 21/2171 |
| WO | WO-2021132466 | A1 | * | 7/2021 | B60N 2/5825 |
| WO | WO-2024084978 | A1 | * | 4/2024 | B60R 21/207 |

OTHER PUBLICATIONS

International Preliminary Report on Patentability issued in International Patent Application No. PCT/JP2023/036316, dated Mar. 1, 2025, along with an English translation thereof.

* cited by examiner

SEAT BACK

CROSS-REFERENCE TO RELATED APPLICATIONS

The present application is a U.S. National Phase entry of, and claims priority to, PCT Application PCT/JP2023/036316, filed Oct. 5, 2023, which claims priority to Japanese Patent Application No. 2022-166734, filed Oct. 18, 2022, both of which are incorporated herein by reference in their entireties for all purposes.

BACKGROUND

One embodiment of the present disclosure relates to a seat back. Specifically, the present disclosure relates to a seat back having a cushion body that elastically supports a seater, and a seat frame that supports the cushion body from the backside of the seat.

A vehicle seat disclosed in Japanese Patent Publication No. 2020-33005 has a cushion body comprising a seat pad and a seat cover. The cushion body is divided into three parts in a seat width direction. Specifically, the cushion body has a configuration in which a main member that forms a central portion in the seat width direction and each side member that forms both side portions in the seat width direction. The main member and each side member are individually assembled and fixed to a seat frame.

In the configuration described in the above publication, an insert wire serving as a reinforcement material or a plate for attachment to the seat frame is included in the side member. Therefore, it is difficult to apply the cushion body having the insert wire and the attachment plate as described above to a configuration in which a side airbag device is mounted on the outside of the seat back. Because there is a risk that the deployment path of the airbag may be inhibited. Therefore, a seat back capable of appropriately assembling the cushion body to the seat frame is required so as not to inhibit the deployment path of the airbag of the side airbag device.

SUMMARY

According to one aspect of the present disclosure, a seat back comprises a cushion body that elastically supports a seater, a seat frame that supports the cushion body from a backside of a seat, and a side airbag device having an airbag that inflates to the front of the seat that is attached to an outer portion in a seat width direction on one side of the seat frame. The cushion body has a seat pad that serves as a cushioning portion, a seat cover that covers the seat pad, and a supporting member. The supporting member extends along the backside of the seat pad in a plane shape, supports the seat pad in a plane shape from the backside of the seat, and is responsible for fastening the ends of the seat cover to the seat frame. The cushion body covers the side airbag device from the front of the seat. The supporting member has an opening for a deployment area of the airbag that inflates to the front of the seat.

Therefore, the supporting member, which extends in a planar shape along the backside of the seat pad, can support the seat pad from the backside of the seat, fasten the ends of the seat cover, and fix the seat cover to the seat frame. By providing an opening that opens the deployment area of the airbag in the support member having such a function, the cushion body can be properly assembled to the seat frame so as to cover the side airbag device from the front of the seat without inhibiting the deployment path of the airbag.

DETAILED DESCRIPTION

A configuration of a seat back 2 according to one embodiment of the present disclosure will be described with reference to FIGS. 1 to 9. In the following description, explanations regarding the directions shall be based on the respective directions of up/down, front/rear, right/left as shown in each figure. The direction used with the "seat" refers to the direction based on the orientation of a seat 1. In the following description, a specific reference figure is not shown, or when there is no reference number corresponding to the reference figure, any of FIGS. 1 to 9 is referred to as appropriate.

Figure 1:
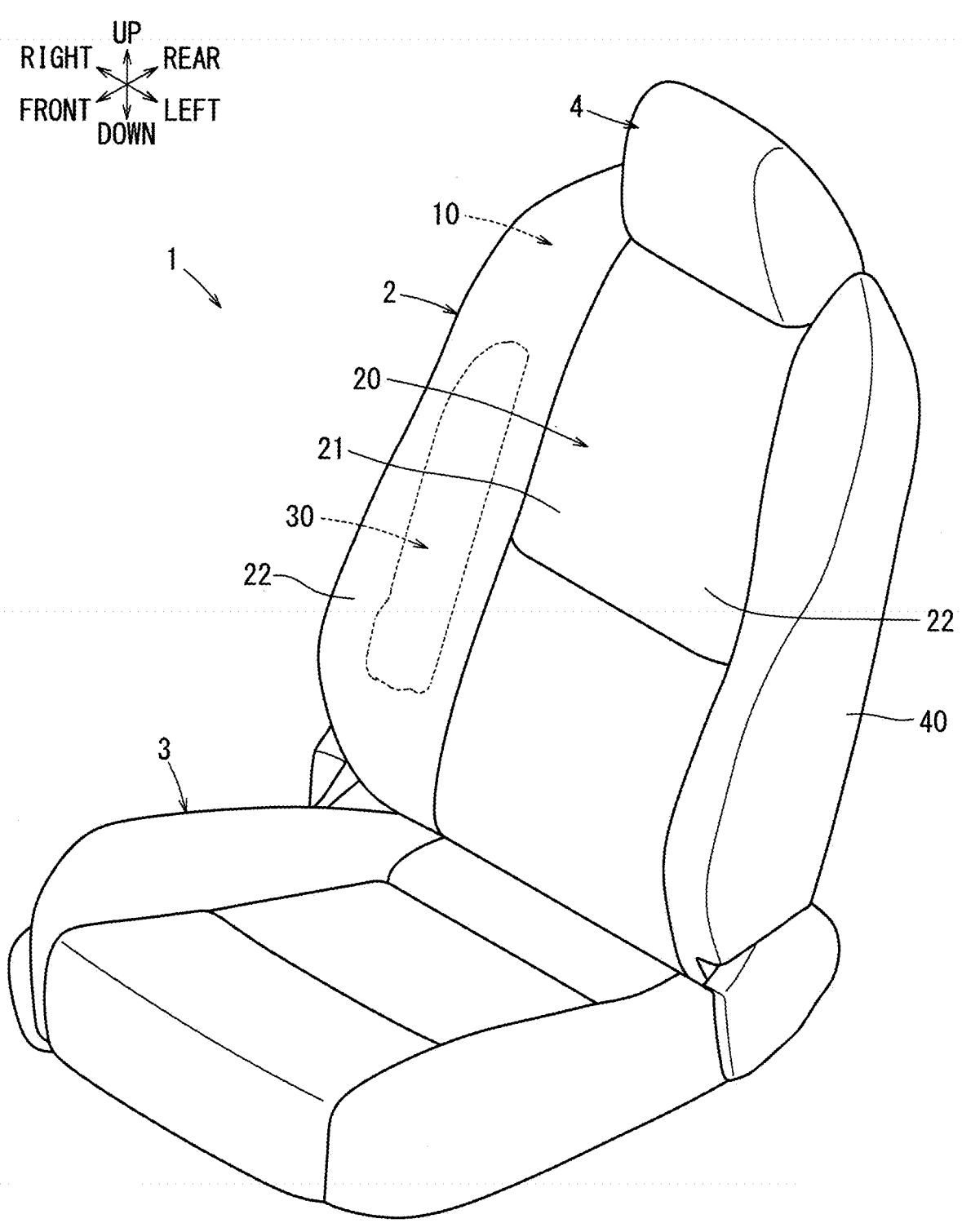
FIG. 1 is a perspective view illustrating a schematic configuration of a seat back according to one embodiment.

As shown in FIG. 1, the seat back 2 according to the present embodiment is a backrest portion of the seat 1 for one person mounted on a floor of an automobile. The seat 1 is a right-side seat of an automobile. The seat 1 includes the seat back 2 forming a backrest portion of a seater, a seat cushion 3 forming a seating portion, and a headrest 4 forming a head rest portion.

Figure 2:
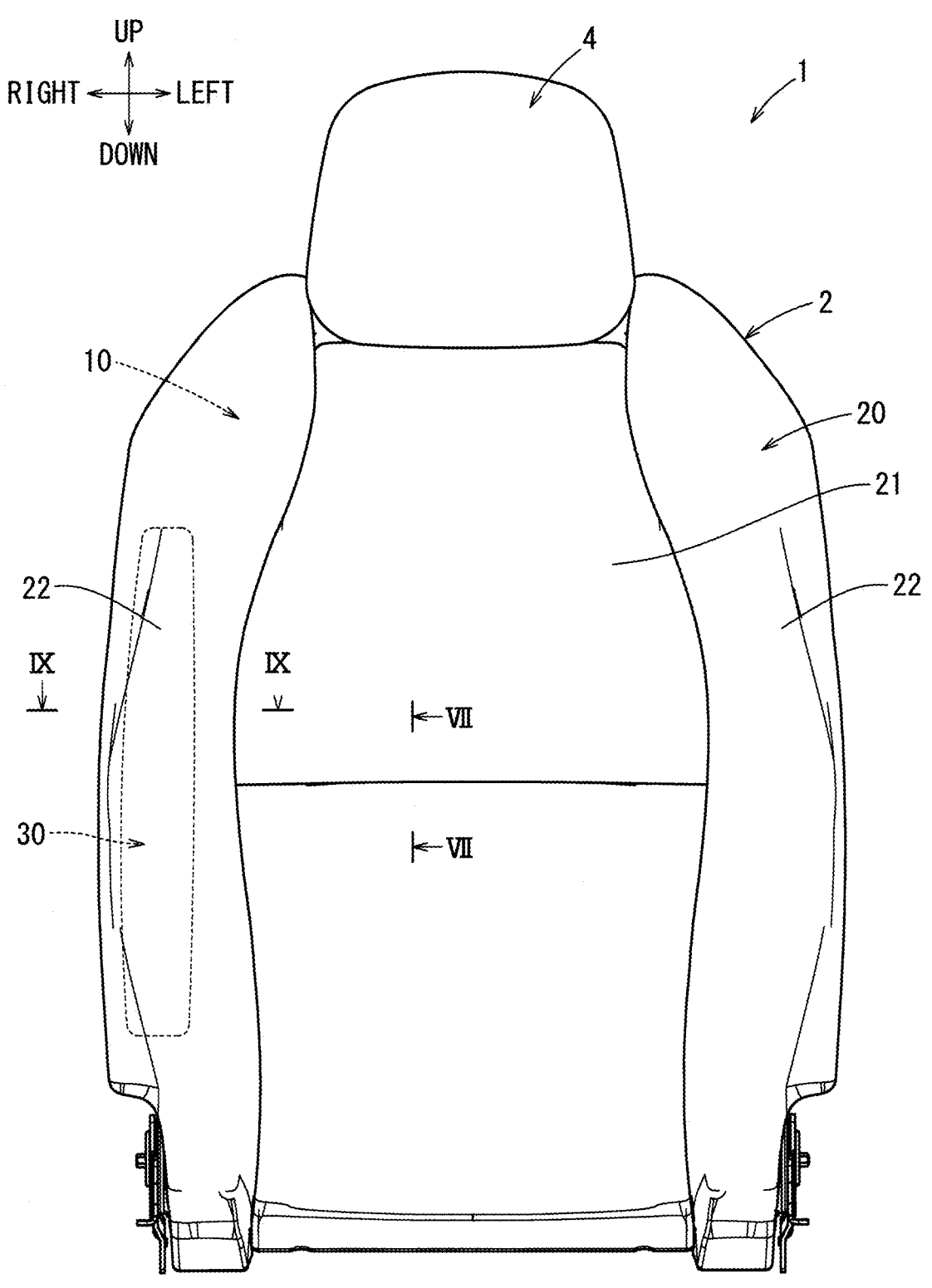
FIG. 2 is a front view of the seat back.

As shown in FIG. 2, the seat back 2 includes a side airbag device 30 on a right side that is an outer side in a vehicle width direction. The side airbag device 30 is a well-known device in which, when a vehicle collision is detected, an airbag 31 breaks through the seat back 2 and inflates to the front of the seat upon receiving a signal of a vehicle collision to protect the seater.

Figure 3:
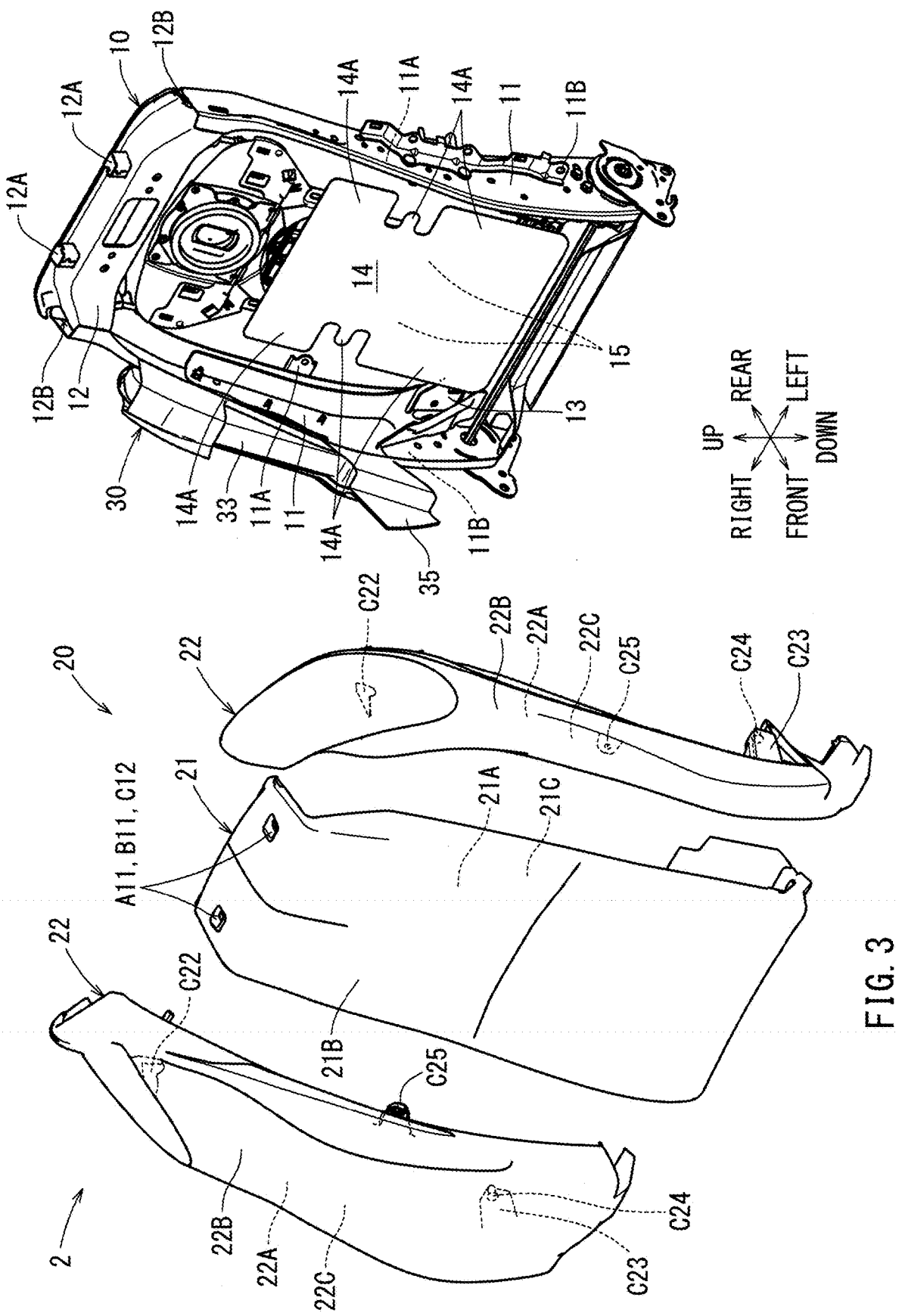
FIG. 3 is an exploded perspective view in which a cushion body is removed from a back frame.

As shown in FIG. 3, the seat back 2 includes a back frame 10 and a cushion body 20. The back frame 10 is made of metal, and forms the framework of the seat back 2. The cushion body 20 is assembled to the front side of the back frame 10 and elastically supports the waist and the back of the seater. The seat back 2 has a backboard 40 that is assembled to the rear side of the back frame 10 and covers the back surface of the seat back 2. Here, the back frame 10 corresponds to one of the "seat frames".

As shown in FIG. 1, the cushion body 20 comprises three divided members. The cushion body 20 is divided into a main member 21, which forms a central portion in the seat width direction, and each side member 22, which forms both side portions in the seat width direction. The main member 21 supports the waist and the back of the seater from rear side.

Each side member 22 supports the waist and the back of the seater from the rear oblique outer side. Each side member 22 has a front surface serving as a surface on the seat front side. The front surface of the side member 22 has a surface shape that rises obliquely forward toward the outside in the seat width direction.

The main member 21 and each side member 22 are individually assembled to the back frame 10 from the frontside of the seat. Specifically, the main member 21 and each side member 22 can be easily attached to and detached from the back frame 10 without removing the seat 1 from the floor.

Figure 4:
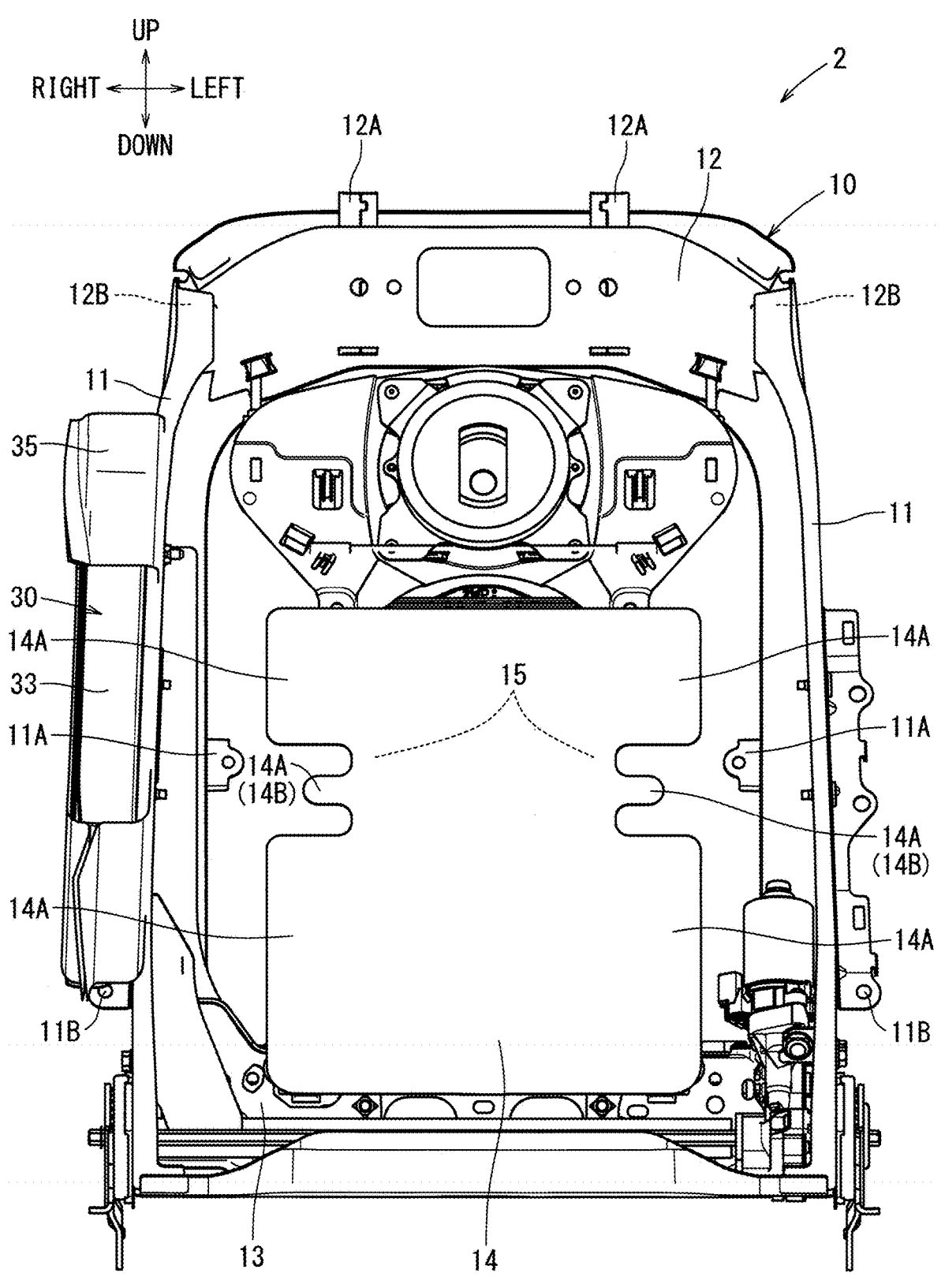
FIG. 4 is a front view of the back frame.

Here, a configuration of each part of the seat back 2 will be described. As shown in FIGS. 3 to 4, the back frame 10 includes a pair of right and left side frames 11 extending vertically along both sides of the seat back 2. The back frame 10 includes an upper frame 12 and a lower frame 13. The upper frame 12 is bridged across the upper ends of the side frame 11. The lower frame 13 is bridged across the lower ends of the side frame 11.

The back frame 10 further includes a lumbar plate 14 positioned to bridge between the upper frame 12 and the lower frame 13. The lumber plate 14 is supported by a U-shaped support spring 15 and capable of vertical movement to adjust lumbar support.

Both upper ends of the U-shaped support spring 15 are passed through the upper frame 12 from below the seat. The lower edges of the U-shaped support spring 15 are assembled to the front of the lower frame 13 with elastic support from behind the seat via a torsion spring (not shown). The lumber plate 14 is a planar member made of resin and has a long shape in the vertical direction.

The upper and lower ends of the lumber plate 14 are assembled so as to be slidable in the vertical direction on each of the right and left sides of the U-shaped support spring 15. The lumbar plate 14 is configured such that the upper and lower ends of the lumbar plate 14 are vertically moved along each side of the support spring 15 by a drive unit (not shown) assembled to the back frame 10.

The lumbar plate 14 is moved such that the distance between the upper end and the lower end of the lumbar plate 14 approaches, so that the intermediate portion between the upper end and the lower end of the lumbar plate 14 is bent so as to curve frontward of the seat. As a result, the support position of the lower half portion of the main member 21 of the cushion body 20 (the support position of the waist) by the lumbar plate 14 is pushed out to frontward of the seat. Thus, the support pressure of the waist of the seater by the main member 21 is strengthened. Further, by vertically moving the upper end and the lower end of the lumbar plate 14 together, the support position of the waist can be adjusted in the vertical direction.

The lumbar plate 14 has a plurality of fin portions 14A on both right and left edges thereof that protrude in a wavy shape to the right and left (the outside in the seat width direction). The lumbar plate 14 has a pair of right and left vertical surfaces extending vertically along each side of the U-shaped support spring 15. Each fin portion 14A overhangs toward the outside from the outer edge of each vertical surface of the lumbar plate 14. Thereby, each fin portion 14A extends the wavy support surface in a region outside each side of the U-shaped support spring 15.

Fastening brackets 11A are welded to the rear edge of each side frame 11. The fastening brackets 11A are plate-shaped and extend obliquely rearward toward the inside of the seat width direction. Each fastening bracket 11A is arranged with their inner diagonally forward-facing front surfaces (overlapping surfaces) facing the assembling space of the main member 21. The seat back side of each side member 22 has a fastening portion C25 extending from a side resin member 22C. The fastening bracket 11A is configured such that the corresponding fastening portion C25 is fastened via the insertion-type fastening structure.

A bracket, which has a round hole-shaped engagement hole 11B, is welded to an outer portion on the lower end of each side frame 11. An engaging clip C24 is attached to a lower portion of the side resin member 22C on the back side of each side member 22. The corresponding engaging clip C24 is engaged with the engagement hole 11B with a snap fit by insertion from the frontside of the seat.

Square cylindrical-shaped support brackets 12A welded to the upper frame 12 are used for assembling headrest 4. Each of the square cylindrical-shaped support brackets 12A is inserted and welded to the upper surface and the lower surface of the upper frame 12 in a vertically penetrating state. The upper end of each of the square cylindrical-shaped support brackets 12A protrudes upward from the upper surface of the upper frame 12.

Each the square cylindrical-shaped support brackets 12A functions as a portion for inserting and assembling the headrest 4 from above the seat back 2 to the upper portion of the seat back 2. Headrest supports (not shown) are inserted to each of the support brackets 12A from above the seat. The headrest support allows a pair of headrest stays (not shown) hanging from the headrest 4 to be inserted and assembled from above the seat.

In each of the right and left end portions (shoulder portions) of the upper frame 12, a fitting hole 12B through which the side member penetrates in the vertical direction is formed. An upper end fitting portion C22 is formed on an upper portion of the side resin member 22C on the back side of the side member 22. The corresponding upper end fitting portion C22 is engaged with each fitting hole 12B by hooking it from above the seat.

Figure 5:
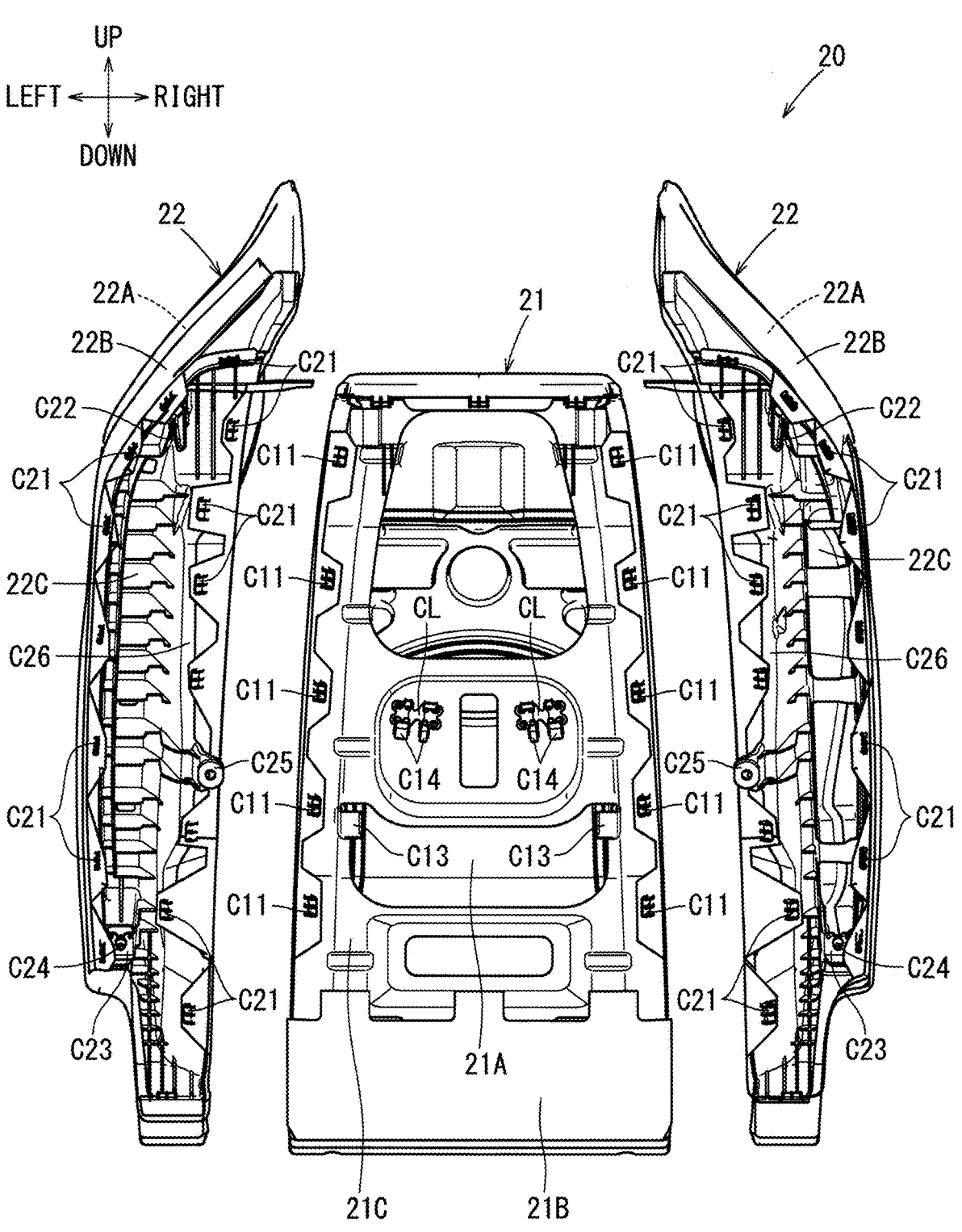
FIG. 5 is a rear view of the cushion body.
Figure 7:
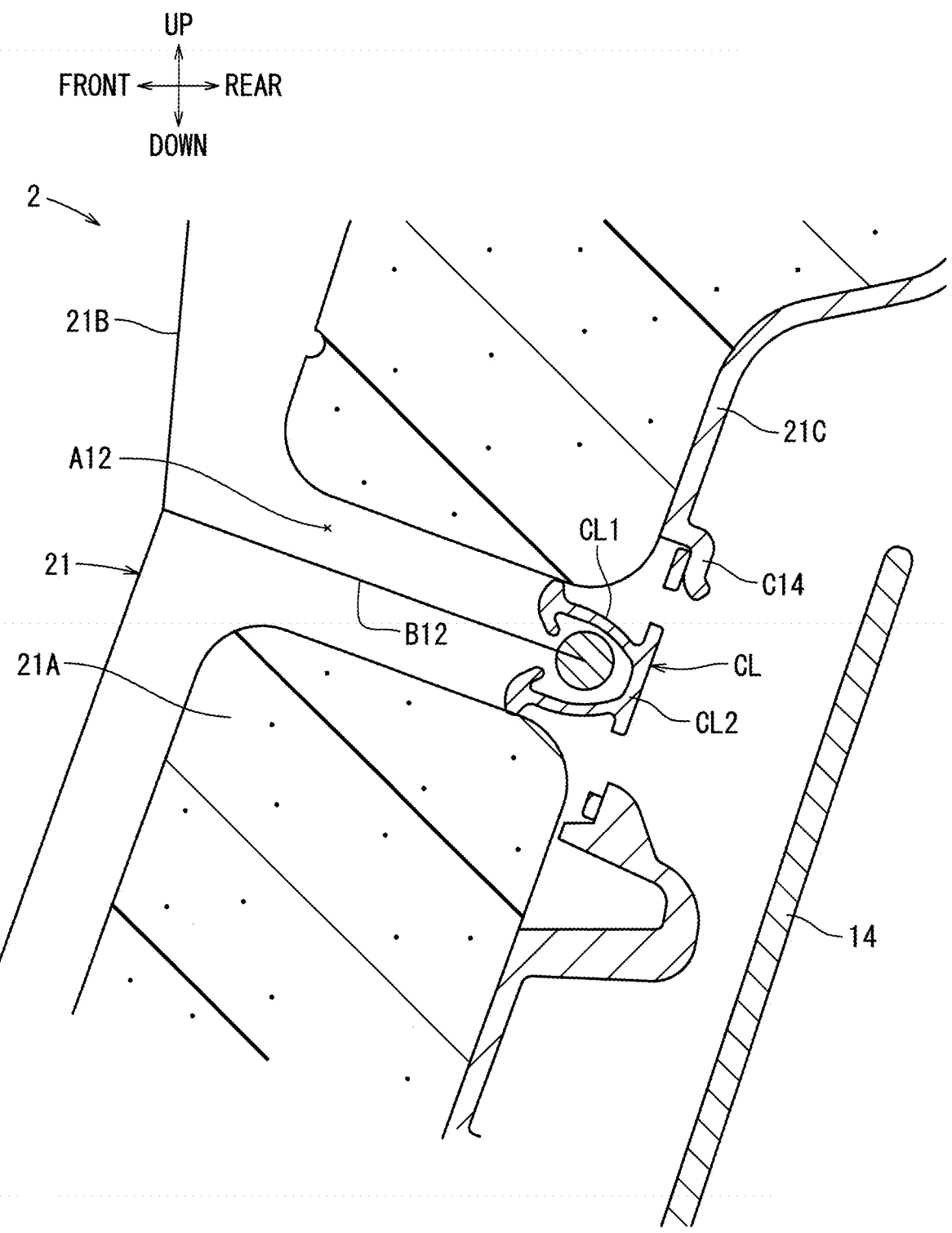
FIG. 7 is a cross-sectional view taken along line VII-VII of FIG. 2.

Next, the configuration of the main member 21 and each side member 22 constituting the cushion body 20 will be described. First, the configuration of the main member 21 will be described. As shown in FIGS. 3, 5, and 7, the main member 21 has a main pad 21A, a main cover 21B, and a main resin member 21C. The main pad 21A is a cushioning portion. The main cover 21B is a fabric cover that covers the main pad 21A. The main resin member 21C is disposed on a pad rear surface, which is a surface on the back side of the main pad 21A.

As shown in FIGS. 5 and 7, the main pad 21A is made of a polyurethane foam molded body. As shown in FIG. 3, the main pad 21A has a mat-shape that covers the upper frame 12 and the lumbar plate 14 of the back frame 10 from the front of the seat. The main pad 21A has an eaves portion covering the upper surface of the upper frame 12 from above the seat.

A pair of right and left support through-holes A11, which have a square hole-shape penetrating in the vertical direction are formed in the eaves portion of the main pad 21A. The upper end of each corresponding support bracket 12A is passed through each support through-hole A11, then the eaves portion of the main pad 21A is placed over the upper surface of the upper frame 12.

The main cover 21B is placed on the main pad 21A from the front of the seat. The upper and lower right and left peripheral edges of the main cover 21B are pulled in and fixed to the rear surface of the main pad 21A. Specifically, as shown in FIG. 5, the main cover 21B is hooked and fixed to the main resin member 21C, which has a frame shape in a rear view, provided on the rear surface of the pad, at each peripheral edge portion drawn into the pad rear surface.

By hooking as described above, the main cover 21B is stretched over the entire outer surface of the main pad 21A. In addition, the main resin member 21C is fixed in a state of being pressed against the back surface of the main pad 21A by hooking the each end of the main cover 21B. In the eaves area of the main cover 21B, which covers the eaves portion of the main pad 21A, a pair of support through-holes B11, which has a square hole-shape and connects each support through-hole A11 to the outside, are formed in the vertical direction.

As shown in FIG. 7, an intermediate portion in the vertical direction of the area of the main cover 21B that covers the front surface of the main pad 21A is pulled rearwardly through a suspension groove A12. The suspension groove A12 is formed in the corresponding position of the main pad 21A. Specifically, the main cover 21B has a suspending portion B12 that is formed on the rear surface of the intermediate portion to be suspended. The suspending portion B12 includes a suspension cloth and a suspension wire. The suspension cloth is a cylindrical fabric that is sewn so as to extend in the seat width direction along the intermediate portion. The suspension wire is passed through the suspended cloth.

The suspending portion B12 is pulled rearwardly through the suspension groove A12 formed so as to penetrate the main pad 21A in the pad thickness direction (seat front-rear direction). Then, the suspending portion B12 is hooked and fixed to each hook CL1 of the four fastening clips CL on the pad rear surface. The fastening clip CL is attached to a clip locking portion C14 of the main resin member 21C and arranged in the seat width direction. Thus, the main cover 21B is stretched in a state in which the intermediate portion is in close contact with the outer surface of the main pad 21A. The clip locking portions C14 is made of elastic claws formed around the holes in the main resin member 21C.

The fastening clip CL comprises a hook CL1 for hooking the suspending portion B12 and a base portion CL2 serving as an attachment portion to the main resin member 21C. The fastening clip CL is made of a resin injection molded product. The fastening clips CL are set by inserting the hooks CL1 into the corresponding holes in the main resin member 21C from the backside of the seat. This allows the fastening clips CL to be snap-fitted in a state where the rear surface of the base portion CL2 in contact with the clip locking portion C14.

Therefore, the base portion CL2 is disposed in a state of being pressed in the front-rear direction between the rear surface of the main resin member 21C and the clip locking portion C14. The fastening clip CL is set in a state where the hook CL1 is inserted into the suspension groove A12 of the main pad 21A with the hook CL1 protruding from the main resin member 21C to the front of the seat. Since the fastening clip CL and the suspending portion B12 are well-known configurations, the description of these details will be omitted.

As shown in FIG. 5, the main resin member 21C is frame-shaped made of an injection molded product that is disposed on the outer periphery of the back surface of the main pad 21A and helps in fastening the main cover 21B. A cover hooking claw C11 is formed on each of the left, right and upper sides of the main resin member 21C extending in a frame shape viewed from the rear. The cover hooking claws C11 are for fastening each end of the main cover 21B that is pulled into the back side of the pad. By hooking each end of the main cover 21B to each cover hooking claw C11, the main resin member 21C is fixed integrally to the pad back surface of the main pad 21A.

As shown in FIG. 3, a support through-hole C12, which has a square-shape, is formed penetrating in the vertical direction in an eaves area overlapping the pad rear surface of the eaves portion of the main pad 21A of the main resin member 21C. Each support through-hole C12 connects each support through-hole A11 of the main pad 21A downward to the seat.

As shown in FIG. 3, the main member 21 is assembled to the back frame 10 from above the seat as follows. First, an eaves portion extending rearward from the upper part of the main member 21 is covered on the upper frame 12. At that time, set the main resin member 21C with each support through-hole C12 through each corresponding support bracket 12A on the upper frame 12. Thereby, the eaves portion of the main member 21 is set in a state of being hooked to the upper end portion of each support bracket 12A and fixed.

Figure 6:
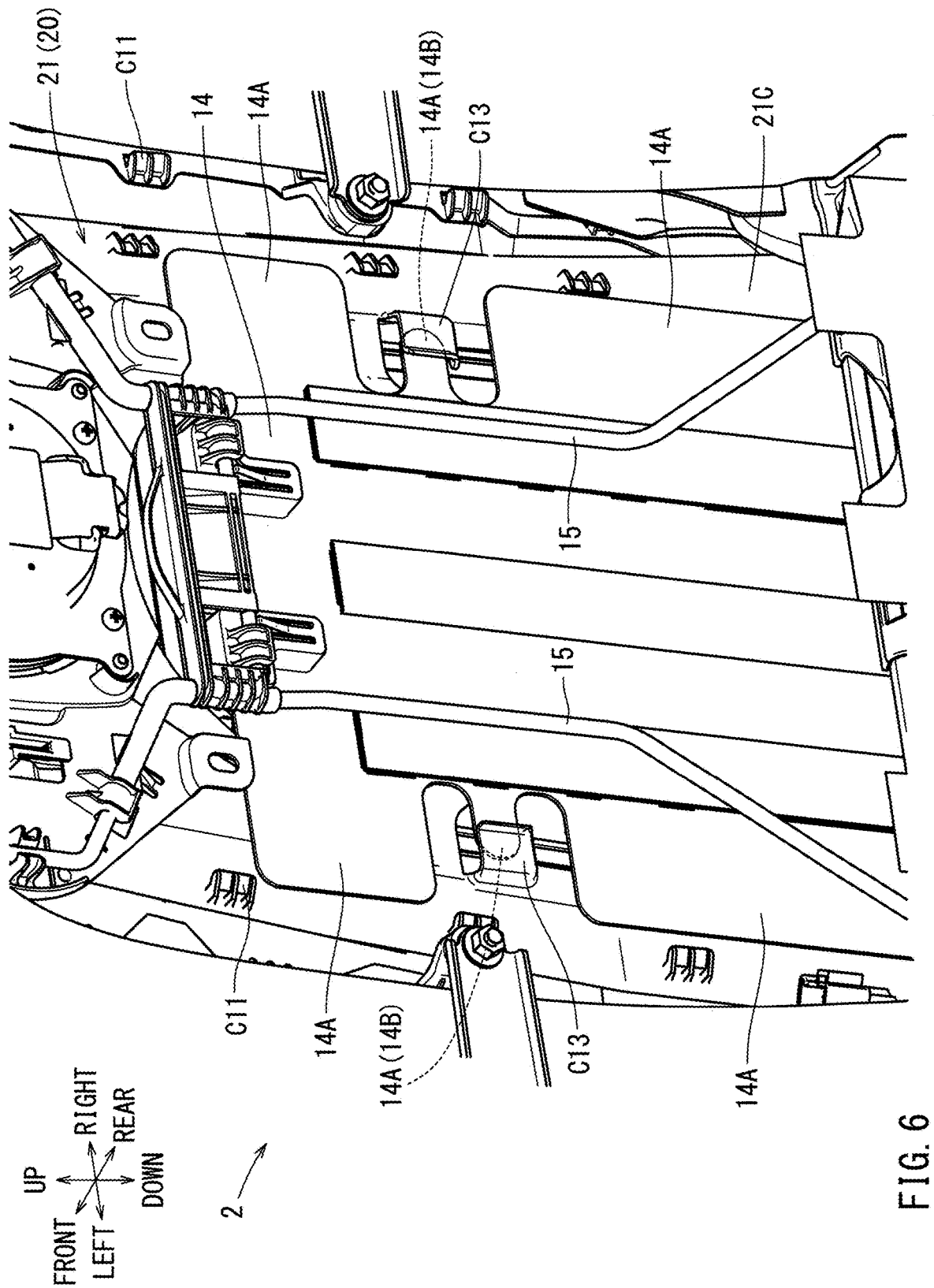
FIG. 6 is a perspective view illustrating an assembled state of the cushion body to the back frame.

Next, the main member 21 is placed over the lumbar plate 14 from front of the seat using the hooked eaves portion as a fulcrum. Then, as shown in FIG. 6, hook each of the middle fin portions 14A (hooking portions 14B) of each of the fin portions 14A of the lumbar plate 14 to the front surface of each of hooked portions C13. Each hooked portion C13 is a part of the main resin member 21C protruding from the inner edge of the right and left frame sides thereof.

Each upper and lower fin portions 14A of the middle fin portions 14A (the hooking portions 14B) hooked on each hooked portions C13 is pressed against the rear surface of each of the right and left side portions of the main resin member 21C. Therefore, the side portions of the main resin member 21C are sandwiched and pressed in the front-rear direction by the fin portions 14A.

The lower end of the main cover 21B extending downward from the main member 21 is pulled rearward of the seat through the lower side of the lower frame 13 of the back frame 10 and fixed to the rear surface of the lower frame 13. By the above assembly, the main member 21 is set such that the upper portion, the lower portion, and the intermediate portion thereof are engaged with the back frame 10 or the lumbar plate 14, respectively.

The above assembly enables the main member 21 to move in the front-rear direction of the seat following the movement of the lumbar plate 14 when the lumbar plate 14 is flexed to bow forward of the seat or when the curvature is returned to the back of the seat. Further, the main member 21 slides each fin portion 14A up and down along the main resin member 21C when the position of the lumbar plate 14 is adjusted in the vertical direction to appropriately smooth the movement.

Next, the configuration of each side member 22 will be described with reference to FIGS. 3, 5, and 9. Each side member 22 includes a side pad 22A, a side cover 22B, and a side resin member 22C, respectively. The side pad 22A is a cushioning portion. The side cover 22B is made of fabric and covers the side pad 22A. The side resin member 22C is disposed on the pad rear surface of the side pad 22A.

Each side member 22 has substantially the same structure. However, since the side airbag device 30 is installed on the right side of the seat back 2, the presence or absence of a path for deploying the airbag 31 and the shape for disposing the side airbag device 30 are different. Here, the side pad 22A corresponds to the "seat pad" of the present disclosure. The side cover 22B corresponds to the "seat cover" of the present disclosure. The side resin member 22C corresponds to the "support member" of the present disclosure.

Figure 9:
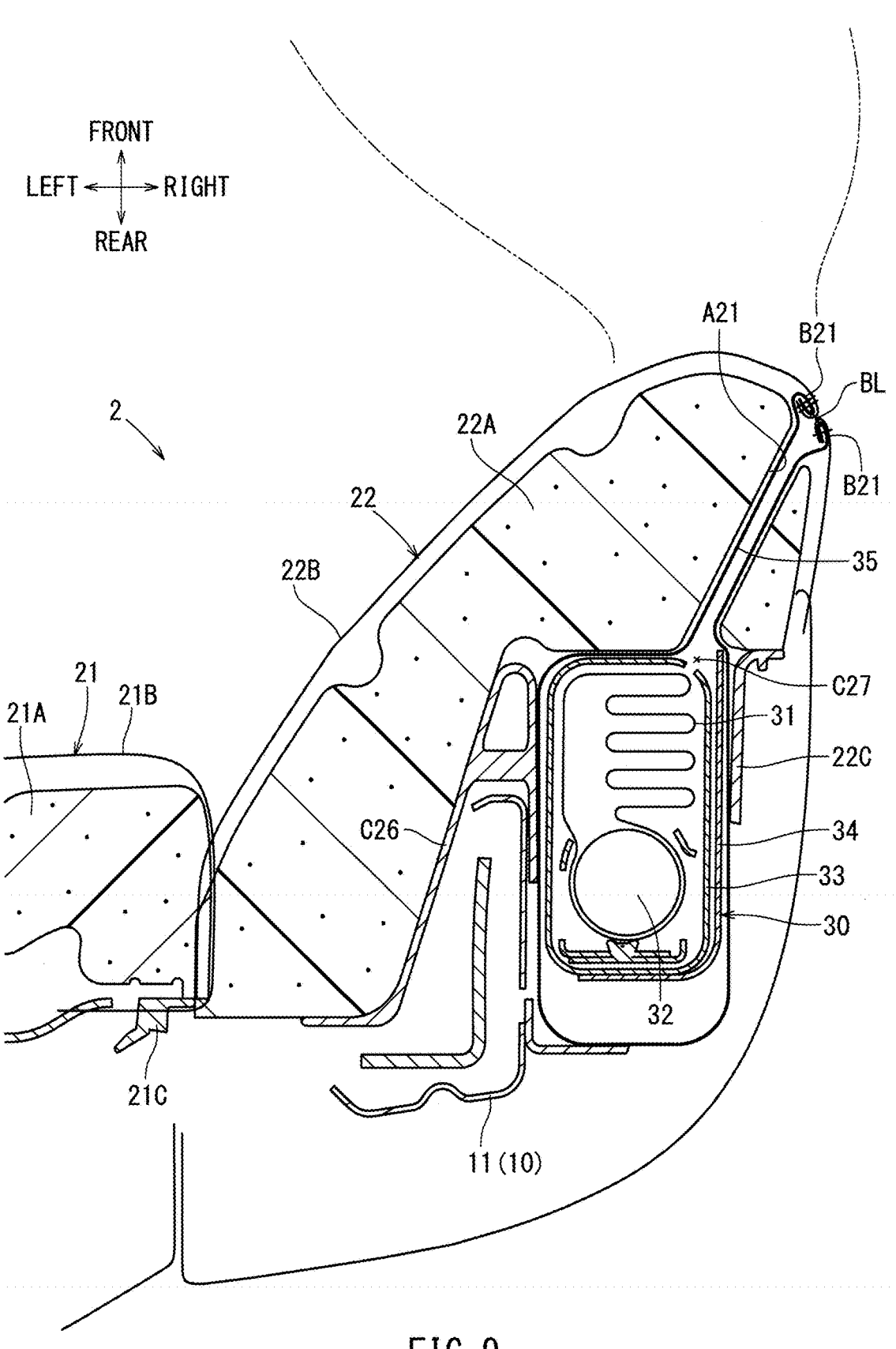
FIG. 9 is a cross-sectional view taken along line IX-IX of FIG. 2.

As shown in FIG. 9, the side pad 22A is made of a polyurethane foam molded body. The side pad 22A is formed in a shape provided with a bank-shaped protrusion so that the pad surface, which is a surface on the seat front side, swells obliquely forward from the inside to the outside in the seat width direction.

The side pad 22A has a rear surface that is hollowed out to be recessed along the bank-shaped protrusion, forming a concave curved surface. As shown in FIGS. 3 and 5, the side pad 22A also has an eaves portion that covers the upper surface of the upper frame 12.

The side cover 22B is placed on the side pad 22A from the front of the seat. The upper and lower right and left peripheral edges of the side cover 22B are pulled in and fixed to the rear surface of the side pad 22A. That is, each of the upper and lower right and left ends of the side cover 22B is pulled into the pad rear surface of the side pad 22A. Each end pulled into the pad rear surface of the side pad 22A is hooked to the side resin member 22C. The side resin member 22C has a curved plate-shape and provided along the back surface of the pad. Thereby, the side cover 22B is fixed to the side pad 22A.

By being hooked as described above, the side cover 22B is stretched over the entire outer surface of the side pad 22A. Also, by hooking each end of the side cover 22B, the side resin member 22C is fixed in a state of being pressed against the back surface of the side pad 22A.

As shown in FIGS. 5 and 9, the side resin member 22C is made of an injection molded product that conforms to the concave curved surface of the back surface of the side pad 22A. The side resin member 22C has a side support portion C26, which supports the bank-shaped protrusion of the side pad 22A at an angle along the overhang from the backside of the pad in a planar manner. This allows the side pad 22A to appropriately support the body of the seater.

A cover hooking claw C21 is formed in a peripheral edge of the side resin member 22C. Each end pulled into the back surface of the side cover 22B is hooked to the cover hooking claw C21. As shown in FIG. 5, an upper end fitting portion C22 protruding downwardly is formed in the eaves area overlapping the pad back surface of the eaves portion of the side pad 22A of the side resin member 22C.

When the side member 22 is assembled to the back frame 10 (see FIG. 3), the upper end fitting portion C22 is inserted into a corresponding fitting hole 12B in right and left ends (shoulder ports) of the upper frame 12 from above the seat. By the above insertion, the upper portion of the side member 22 is set in a state of being hooked and fixed on the upper frame 12.

As shown in FIG. 5, a pedestal portion C23 protruding rearward of the seat is formed at a lower portion of the side resin member 22C. The engaging clip C24 is attached to the tip of the pedestal portion C23. When the side member 22 is assembled to the back frame 10 (see FIG. 3), the engaging clip C24 at the lower portion of the side resin member is inserted into a corresponding engagement hole 11B at a rear edge portion on the lower end of each side frame 11 with a snap fit. In this way, the lower portion of the side member 22 is engaged with the lower portion of each side frame 11 and is set in a position-fixed state.

Figure 8:
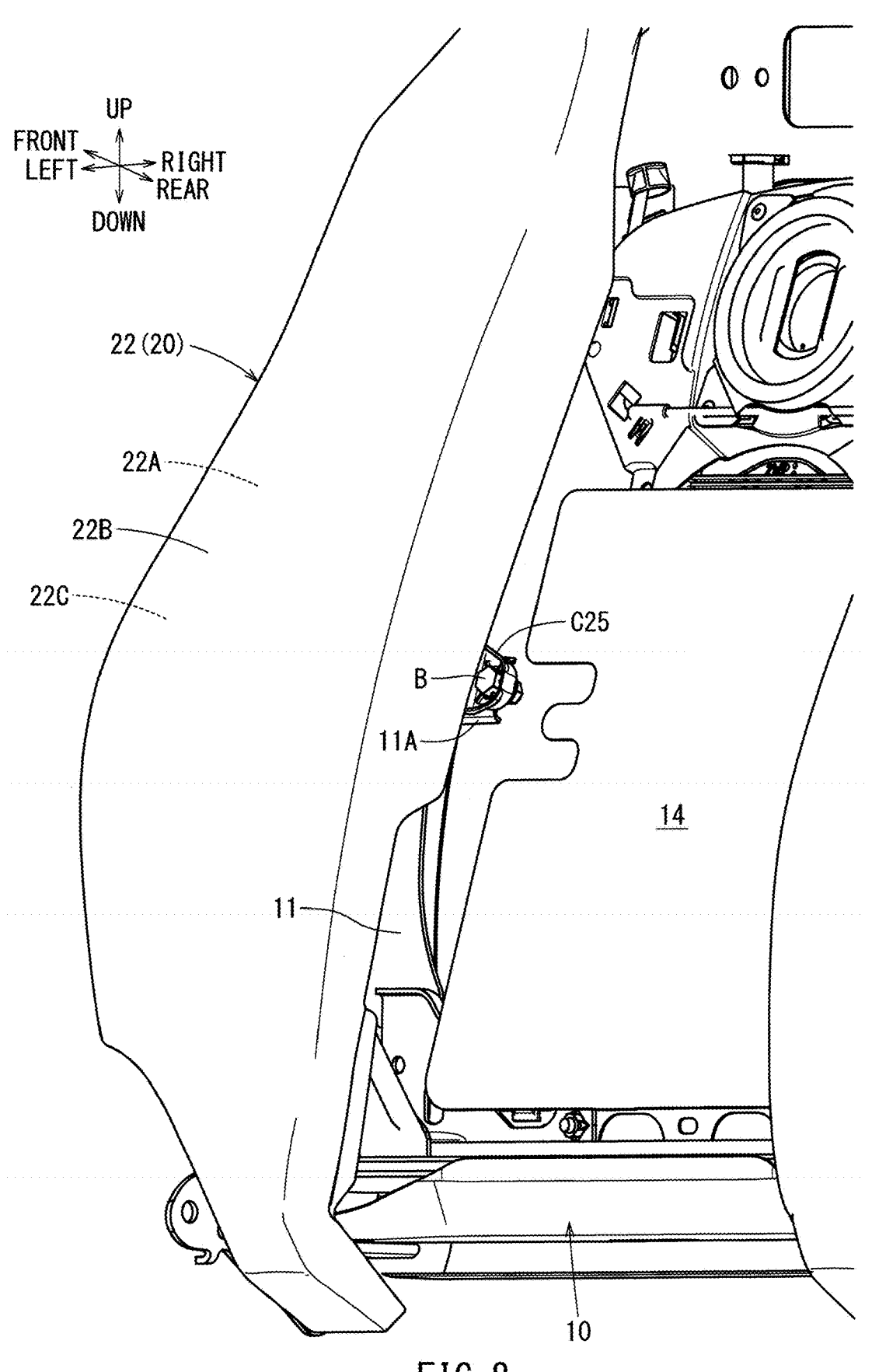
FIG. 8 is a perspective view illustrating a state in which a side resin member on the outer side is assembled to the side frame.

In addition, the fastening portion C25 is formed in an intermediate portion of the side resin member 22C in the vertical direction. The fastening portion C25 has a plate shape and extends obliquely rearward from an inner edge portion toward the inside in the seat width direction. As shown in FIG. 8, the fastening portions C25 of the side resin member 22C is set to overlap the front surface (diagonally forward-facing overlapping surface) of the fastening brackets 11A, which extend inwardly and rearwardly from each side frame 11, by assembling the side member 22 to the back frame 10.

After setting as described above, the bolt B, which is the insertion-type fastening structure, is inserted into the fastening portion C25 and the fastening bracket 11A by using a fastening tool (for example, an impact driver) (not shown) to be fastened. Thus, the fastening portion C25 is fastened to the upper surface of the fastening bracket 11A in an over-lapped state.

Next, the configuration of the side airbag device 30 will be described with reference to FIG. 9. The side airbag device 30 is attached to the right side (outside) of the side frame 11 on the right side (outside in the vehicle width direction). The side airbag device 30 is formed in a vertically long box shape extending vertically along the side frame 11 on the right side (see FIG. 4).

Specifically, the side airbag device 30 includes an airbag 31, an inflator 32, a case 33, a guide plate 34, and a stay cloth 35. When the side airbag device 30 receives a signal of the vehicle collision from an ECU (not shown), the inflator 32 injects gas into the airbag 31. Thereby, the airbag 31 inflates to the front of the seat upon activation. The airbag 31 breaks through the seat back 2 over a wide range in the vertical direction of the seat back 2. Then the airbag 31 is inflated and deployed to form a vertically long bag shape in front of the seat.

The case 33 is a vertically long box-shaped container that houses the airbag 31 and the inflator 32 therein. The upper and lower portions on the inner side of the case 33 are bolted and fixed to the right side of the side frame 11 on the right side. The case 33 has an open cross-sectional container structure in which the corner on the right front side is opened by a vertically long slit that allows the airbag 31 to inflate and deploy to the front of the seat.

The case 33 is disposed on the back side of the side resin member 22C. An opening C27 for the deployment area of the airbag 31 is formed in the side resin member 22C. Therefore, a deployment path of the airbag 31 inflates from the case 33 located on the back side of the side resin member 22C is secured. The opening C27 is formed in a vertically long rectangular opening shape so as to open substantially the entire area of the area facing the case 33.

The guide plate 34 is made of a metal and is a vertically long plate-like member having an L-shaped cross section. The guide plate 34 is fixed to the rear portion of the case 33 and covers the right side of the case 33. The guide plate 34 is disposed so as to protrude from the right side of the case 33 to the front of the seat through the opening C27 of the side resin member 22C. Therefore, when the airbag 31 is inflated and deployed, the guide plate 34 covers the edge of the opening C27 from the inside of the opening. Thus, the guide plate protects that airbag 31 from direct contact with the edge of the opening C27 in the supporting member.

The stay cloth 35 is a guide cloth that guides the deploy-ment direction of the airbag 31. The stay cloth 35 is composed of a single piece of cloth material. The stay cloth 35 wraps the case 33 from the rear side of the seat. Further, each end of the stay cloth, which wraps the case 33 and passed through the opening C27 and a slit A21 in side pad 22A, is sewn with the sewn end B21 of side cover 22B. Each sewn end B21 is an end of each cover piece that is broken by the deployment pressure of the airbag 31.

The slit A21 formed in the side pad 22A is a through-hole for passing the airbag 31 that expands from the opening C27 during the inflation and deployment of the airbag 31. The slit A21 extends through the entire vertical direction of the side pad 22A directly opposite the case 33 in a longitudinal manner.

The airbag 31 pushes open the case 33 and inflates through the opening C27 of the side resin member 22C when the airbag 31 received gas injection from the inflator 32. Thereafter, it further inflates toward the front of the seat while pushing and expanding the slit A21 of the side pad 22A from the backside of the pad. The airbag 31 then breaks the stitches at each sewn end B21 forming a burst line BL of the side cover 22B that is stitched to each end of the force cloth 35 by the deployment pressure. As a result, the airbag 31 is inflated and deployed from between each sewn end B21 to the front of the seat.

A method for assembling the cushion body 20 to the back frame 10 will be described. Referring to FIG. 3, in the cushion body 20, first, each of the side members 22 is assembled to the back frame 10 before the main member 21 is assembled to the back frame 10 (the side member assembly step). The method for assembling each side member 22 to the back frame 10 is as described above.

After assembling each side member 22, the main member 21 is assembled to the back frame 10 (the main member assembly step). According to the above steps, the cushion body 20 composed of three divided members can be easily and appropriately assembled to the back frame 10. The procedure of detaching the cushion body 20 from the back frame 10 is a procedure reverse to that described above.

In summary, the seat back 2 according to the present embodiment is configured as follows. Note that, in the following, a reference number to be added in parentheses is a number corresponding to each configuration shown in the above-described embodiment.

A seat back (2) has a cushion body (20) that elastically supports a seater, and a seat frame (10) that supports the cushion body (20) from a backside of a seat. The seat back (2) has a side airbag device (30) having an airbag (31) that inflates to the front of the seat that is attached to an outer portion in a seat width direction on one side of the seat frame.

The cushion body (20) has a seat pad (22A) that serves as a cushioning portion, a seat cover (22B) that covers the seat pad (22A), and a supporting member (22C). The supporting member (22C) extends along the backside of the seat pad (22A) in a plane shape, supports the seat pad (22A) in a plane shape from the backside of the seat, and is responsible for fastening the ends of the seat cover (22B) to the seat frame (10). The cushion body (20) covers the side airbag device (30) from the front of the seat. The supporting member (22C) has an opening (C27) for a deployment area of the airbag (31) that inflates to the front of the seat.

According to the above configuration, the supporting member (22C), which extends in a planar shape along the backside of the seat pad (22A), can support the seat pad (22A) from the backside of the seat, fasten the ends of the seat cover (22B), and fix the seat cover to the seat frame (10). By providing an opening (C27) that opens the deployment area of the airbag (31) in the support member (22C) having such a function, the cushion body (20) can be properly assembled to the seat frame (10) so as to cover the side airbag device (30) from the front of the seat without inhibiting the deployment path of the airbag (31).

The cushion body (20) comprises three divided members, which is divided into a main member (21) forming a central portion in the seat width direction and each side member (22) forming both side portions in the seat width direction. One of two side members (22) has the supporting member (22C) that is provided to cover the side airbag device (30) from the front of the seat. Further, the side member (22) has a side support portion (C26) that supports the body of the seater from an oblique side via the seat pad (22A).

According to the above configuration, the side support portion (C26) of the supporting member (22C) that is fixed to the seat frame (10) and supports the seat pad (22A) in a planar manner from the backside of the seat can appropriately perform the side support for the seater.

The seat back (2) further includes a stay cloth (35). The stay cloth (35) wraps the side airbag device (30) from the rear side of the seat. Both ends of the stay cloth (35) pass through an opening (C27) and a slit (A21) in the seat pad (22A) that forms a deployment path of the airbag (31). Then, each end of the stay cloth (35) is sewn together with a sewn end of each cover piece, the stitching of which is broken by the deployment pressure of the airbag (31).

According to the above configuration, the airbag (31) can be appropriately pressed against the stitching portion of the sewn end (B21) of each cover piece of the seat cover (22B), which becomes a burst line (BL), from the opening (C27) of the supporting member (22C) through the slit (A21) in the seat pad (22A) by the stay cloth (35). Thereby, the inflation and deployment pressure of the airbag (31) can be appropriately concentrated on the burst line (BL), and the airbag (31) can be appropriately inflated and deployed.

The present disclosure can be implemented in various forms, in addition to the embodiments described above.

The seat back of the present disclosure may be configured as a seat back of a seat mounted in a vehicle other than an automobile, such as a train, aircraft, or ship. The cushion body may consist of three elements divided into a main member and each side member, or it may consist of a single undivided member.

The supporting member provided on the back surface of the seat pad and fixed to the seat frame may be made of metal other than resin.

The main cover and the side cover may each be made of leather other than the fabric.

According to another aspect of the present disclosure, the cushion body comprises three divided members, which is divided into a main member forming a central portion in the seat width direction and each side member forming both side portions in the seat width direction. One of the side members has the supporting member that is provided to cover the side airbag device from the front of the seat. Further, the side member has a side support portion that supports the body of the seater from an oblique side via the seat pad.

Therefore, the side support portion of the supporting member that is fixed to the seat frame and supports the seat pad in a planar manner from the backside of the seat can appropriately perform the side support for the seater.

According to another aspect of the present disclosure, the seat back further includes a stay cloth. The stay cloth wraps the side airbag device from the rear side of the seat. Both ends of the stay cloth pass through an opening and a slit in the seat pad that forms a deployment path of the airbag. Then, each end of the stay cloth is sewn together with a sewn end of each cover piece, the stitching of which is broken by the deployment pressure of the airbag.

Therefore, the airbag can be appropriately pressed against the stitching portion of the sewn end of each cover piece of the seat cover, which becomes a burst line, from the opening of the supporting member through the slit in the seat pad by the stay cloth. Thereby, the inflation and deployment pressure of the airbag can be appropriately concentrated on the burst line, and the airbag can be appropriately inflated and deployed.

The various examples described above in detail with reference to the attached drawings are intended to be representative of the present disclosure and are thus non-limiting embodiments. The detailed description is intended to teach a person of skill in the art to make, use and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved seat back, and/or methods of making and using the same.

The invention claimed is:

1. A seat back comprising:
a cushion body that elastically supports a seater;
a seat frame that supports the cushion body from a backside of a seat; and
a side airbag device having an airbag that inflates to the front of the seat that is attached to an outer portion in a seat width direction on one side of the seat frame,
wherein the cushion body further comprises a seat pad serving as a cushioning portion, a seat cover for covering the seat pad, and a supporting member that is extendable along the backside of the seat pad in a plane shape, wherein the supporting member is configured to support the seat pad in a plane shape from the backside of the seat and to fasten the ends of the seat cover to the seat frame,
wherein the cushion body covers the side airbag device from the front of the seat, and wherein the supporting member has an opening for a deployment area of the airbag that inflates to the front of the seat.

2. The seat back according to claim 1, wherein
the cushion body comprises a main member forming a central portion in the seat width direction and two side members forming both side portions in the seat width direction, and wherein
the supporting member has a side support portion which is disposed with one of the side members covering the side airbag device from the front of the seat and supports the body of the seater from an oblique side via the seat pad.

3. The seat back according to claim 1, further comprises a stay cloth, wherein
the stay cloth wraps the side airbag device from the rear side of the seat, each end of the stay cloth passes through an opening and a slit in the seat pad that forms a deployment path of the airbag, and the each end of the stay cloth is sewn to an end of each cover piece, which breaks upon airbag deployment.

4. A seat back comprising:
a cushion body that elastically supports a seater; and
a seat frame that supports the cushion body from a backside of a seat,
wherein the cushion body has a main member and two side members, and wherein the side member has a supporting member, and wherein the supporting member has an opening for a deployment area of an airbag that inflates to a front of the seat, and
the main member further comprises a main pad for supporting a waist and back of the seater, a main cover that stretches over the main pad, and a main resin member for supporting the main pad from a backside and fastening the main cover.

5. The seat back according to claim 4, wherein the cushion body has a seat pad, a seat cover for covering the seat pad, and the supporting member that extends along the backside of the seat pad in a plane shape.

6. The seat back according to claim 4, further has a stay cloth that guides a deployment direction of the airbag, wherein the stay cloth is sewn to an end of each cover piece, which breaks upon airbag deployment.

7. The seat back according to claim 4, further has a side airbag device being attachable to an outer portion in a seat width direction on one side of the seat frame.

8. The seat back according to claim 7, wherein the side airbag device has the airbag that inflates and deploys to a front of the seat and a guide plate that protects the airbag from direct contact with edges of the opening of the supporting member.

9. A seat back comprising:
a cushion body that elastically supports a seater; and
a seat frame that supports the cushion body from a backside of a seat,
wherein the cushion body has a main member and two side members, and wherein the side member has a supporting member, and wherein the supporting member has an opening for a deployment area of an airbag that inflates to a front of the seat, and
the side members further comprises a side pad for supporting the waist and back of the seater from an oblique outer side, a side cover that stretches over the side pad, and a side resin member for supporting the side pad from a backside and fastening the side cover.

* * * * *